United States Patent [19]

Pusch

[11] 3,853,359

[45] Dec. 10, 1974

[54] VEHICLE TRACK

[75] Inventor: Allen A. Pusch, Calgary, Alberta, Canada

[73] Assignee: Foremost International Industries, Ltd., Calgary, Alberta, Canada

[22] Filed: Oct. 1, 1973

[21] Appl. No.: 402,652

[30] Foreign Application Priority Data
Oct. 24, 1972  Canada............................... 154718

[52] U.S. Cl.............................. 305/35 EB, 305/47
[51] Int. Cl............................................. B62d 55/00
[58] Field of Search ............ 305/35 EB, 37, 38, 47, 305/48

[56] References Cited
UNITED STATES PATENTS

| | | | |
|---|---|---|---|
| 2,378,427 | 6/1945 | Myers | 305/38 |
| 2,515,128 | 7/1950 | Lammertse | 305/38 |
| 2,516,115 | 7/1950 | Hagenbuch | 305/38 X |
| 3,345,113 | 10/1967 | Siber | 305/38 X |

FOREIGN PATENTS OR APPLICATIONS 840,882    5/1970    Canada................................ 305/38

Primary Examiner—David Schonberg
Assistant Examiner—John A. Carroll

[57] ABSTRACT

A vehicle track of the type consisting of a pair of continuous, spaced, parallel rubber belts and a plurality of transverse grouser bar assemblies secured to the belts. The grouser bar assemblies are disposed at spaced intervals along the track so that sections of the belts are exposed between the assemblies. In order to protect the outside edges of the belts between the grouser bar assemblies, rigid rods are fixed to the opposite outer ends of each grouser bar assembly the rods extending in the longitudinal direction of the track and being closely spaced in the longitudinal direction so as to provide a substantially continuous barrier against sharp rocks, stumps and other debris engaging the outside edges of the belts.

6 Claims, 4 Drawing Figures

PATENTED DEC 10 1974　　　　　　　　　　　3,853,359
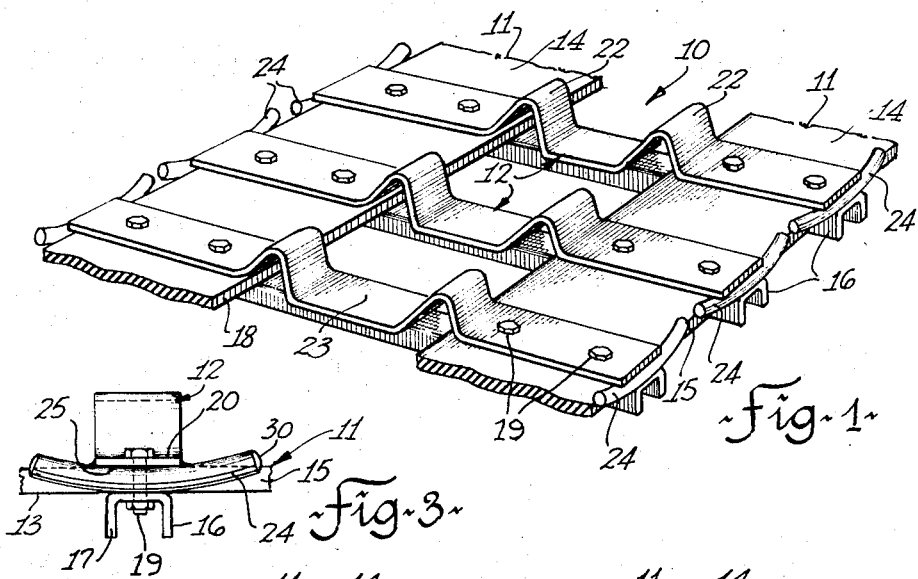
Fig. 1
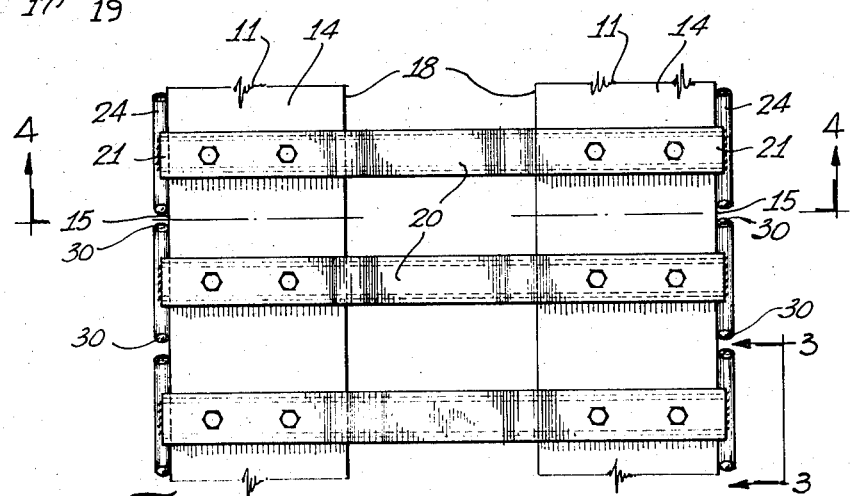
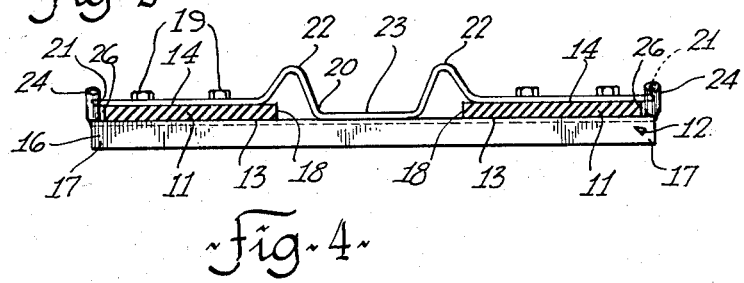
Fig. 2
Fig. 3
Fig. 4

VEHICLE TRACK

This invention relates to tracks for use on endless track vehicles.

A number of different types of tracks are in common use on vehicles, and one of the low ground pressure type consists of a pair of wide belts which are disposed in side-by-side, spaced relationship and connected by a plurality of transverse grouser bars. The belts provide exposed ground engaging surfaces between the grouser bars. It has been found that when vehicles having this type of track are utilized on terrain which is covered with sharp stones, debris or stumps and pieces of wood, such as encountered when the vehicle is used harvesting timber and pulp wood, the belts of the track deteriorate rather quickly. The outside edges of the belts in particular become chipped, gouged and torn to the extent that the shorter life of the tracks on vehicles used in forest operations is a serious problem.

It is an object of the present invention to provide a vehicle track which is less subject to damage when utilized in an environment where the tracks are continuously engaging rigid and sharp articles.

According to the present invention, there is provided a pair of spaced, parallel, flexible belts defining outer ground engaging surfaces, inner surfaces and opposed longitudinally extending outside edges of the track, and a plurality of transverse grouser bar assemblies at spaced intervals along the belt. Each grouser bar assembly includes an outer grouser bar member engaging the ground engaging surfaces of the belts, a track guide member engaging the inner surfaces of the belt and connecting means securing the members together with the belts clamped between the grouser bar member and the track guide member. At least one of the members extend the full width of the track and have opposite end portions terminating adjacent the outside edges of the track, and a pair of rigid members is associated with each grouser bar assembly. The pair of rigid members are fixed one each to the opposite end portions and extend substantially perpendicularly to the grouser bar assembly immediately outside of the outside edges. The rigid members of adjacent grouser bar assemblies are closely spaced in a longitudinal direction of the track along each side of the track so as to provide a substantially continuous edge protector for the belts.

Preferably the rigid member at each end of the grouser bar assembly is disposed in substantially the same plane as the belts.

One embodiment is illustrated by way of example, in the accompanying drawings in which:

FIG. 1 is a top perspective view of a section of the track according to the present invention;

FIG. 2 is a plane view of the sections of track;

FIG. 3 is a side view of the section of track as seen from the line 3—3 of FIG. 2; and FIG. 4 is a sectional view as seen from the line 4—4 of FIG. 2.

The reference numeral 10 generally denotes the track which includes a continuous flexible belting in the form of a pair of spaced, parallel rubber belts 11,11 joined by a plurality of transverse grouser bar assemblies 12. The belts 11,11 define outer ground engaging surfaces 13,13, inner surfaces 14,14 and opposed longitudinally extending outside edges 15,15 and spaced inside edges 18,18.

Each grouser bar assembly 12 includes an outer grouser bar member 16 which is U-shaped in cross-section, as may be readily observed in FIG. 3. The base of the U-shaped section engages the ground engaging surfaces 13,13 of the belts 11,11 and the grouser bar member 16 is slightly longer than the spacing of the outside edges 15,15 so that opposite end portions 17,17 thereof project outwardly slightly past the outside edges. A track guide member 20, which is of substantially the same length as the grouser bar member 16 and has opposite end portion 21,21 projecting laterally from the outside edges of the belts, engages the inner surfaces 14,14 of the belts. In the vicinity of the inner edges 18,18 of the pair of belts, the track guide member 20, which may be made from relatively flat lengths of steel, is provided with a pair of raised portions 22,22 formed by smoothly curved bends in the track guide member. Between the raised portions, there is provided a straight transverse section 23, which is preferably in a lower plane than the outer end portions 21,21 as best seen in FIG. 4, so as to engage the base portion of the U-shaped grouser bar member. Thus, in the longitudinal direction of the track, the central portion of the track guide, as formed by the pair of raised portions 22,22 joined by the relatively straight transverse section 23, effectively defines a longitudinally extending trough in the space between the pair of belts and which the wheels of the vehicle (not shown) run.

The grouser bar assembly 12 also includes connecting means, which may be in the form of bolts 19 or similar devices, which secure grouser bar member 16 and the track guide member 20 together with the belts 11,11 in their spaced relationship clamped between the members 16 and 20.

Since the end portion 17 and 21 of the grouser bar member 16 and track guide member 20 project slightly past the outside edges 15,15 at opposite sides of the track, there is defined therebetween a space 26 which is contiguous with the outside edges 15,15. An elongated rigid member in the form of a rod 24 is welded to an inside surface 25 of the end portion 21 of the track guide member 20 and has its mid-portion disposed in the space 26. The rod 24, which is therefore generally disposed in the same plane as the belts 11,11 extends in the longitudinal direction of the track, and each rod, which is nearly as long as the longitudinal spacing of the grouser bar assemblies, has opposite ends 30,30 thereof closely spaced with the ends of the rod attached to the grouser bar assembly at either side. In the embodiment illustrated in the drawings, the rod is formed from stock of circular cross-section and the ends 30,30 are preferably rounded. Moreover, since the track passes around sprockets or wheels at the front and rear of the track assembly of the vehicle the rods are slightly curved inwardly relative to the plane of the outer surfaces 13,13 of the belts (see FIG. 3). Thus, as the track curves around the sprockets or wheels, the ends do not project significantly from the track. As best seen in FIG. 3 the rod 24 is secured at its mid-point to the end portion 21 of the track guide member and it may be bent on a smooth curve so as to be actually of arcuate shape.

Instead of being secured to the track guide member 20, the rods may alternatively be welded to an inside surface of the outer end of portion 17 of the grouser bar member 16 so that the grouser bar member 16 and the rods 24 at the opposite ends thereof are effectively an integral unit.

It may be readily observed, therefore, that in the longitudinal direction of the track the series of rigid members or rods 24 along each side of the track provide a substantially continuous protective means for the outside edges 15,15 of the belts, which edges have been found to be most vulnerable to rapid deterioration when the track is operated on a terrain covered by hard or sharp articles. The rods do in fact act somewhat as a reinforcement for the track and assist the track in riding over rocks or stumps or other debris which would otherwise gouge the belts at points even inwardly from the outside edges 15,15. Accordingly, the presence of the rods 24 results in a significantly longer life for the track particularly when utilized on the type of terrain discussed above, and costly replacements and loss of operating time are reduced.

Although one specific embodiment is described for illustration purposes, it is apparent that one skilled in the art could adopt certain modifications without departing from the spirit of the invention as is defined in the appending claims.

The embodiments of the invention in which an exclusive property or privilege is claimed are defined as follows:

1. A vehicle track comprising a pair of spaced, parallel, flexible belts defining outer ground engaging surfaces, inner surfaces and opposed longitudinally extending outside edges of said track, a plurality of transverse grouser bar assemblies at spaced intervals along said belts and each including an outer grouser bar member engaging said ground engaging surfaces of said belts, a track guide member engaging said inner surfaces of said belts and connecting means securing said members together with said belts clamped therebetween, at least one of said members extending the full width of the track and having opposite end portions terminating adjacent said outside edges of the track, and a pair of rigid members associated with each grouser bar assembly, the pair of rigid members being fixed one each to said opposite end portions and extending substantially perpendicular to the grouser bar assembly immediately outside of said outside edges, the rigid members of adjacent grouser bar assemblies being closely spaced in the longitudinal direction of the track along each side of the track so as to provide a substantially continuous edge protector for the belts.

2. A vehicle track as defined in claim 1, wherein the rigid member is disposed in substantially the same plane as the belts.

3. A vehicle track as defined in claim 1, wherein said grouser bar member and track guide member both have opposite end portions projecting slightly outward from the side edges of said belts so as to define spaces therebetween contiguous with the outside edges of the track, the pair of rigid members extending through said spaces and being disposed substantially in the same plane as the belts.

4. A vehicle track as defined in claim 1, wherein the rigid member is a rod of circular cross section welded to said track guide member.

5. A vehicle track as defined in claim 1, wherein each rigid member is an elongated member substantially equal in length to the spacing of said grouser bar assemblies and being connected at its mid-point to one of said grouser bar and track guide members.

6. A vehicle track as defined in claim 1, wherein each rigid member is an elongated member connected substantially at its mid-point to one of said grouser bar and track guide members, said elongated member curving inwardly of the track relative to the plane of said outer ground engaging surfaces of the belts.

* * * * *